US007285316B2

(12) United States Patent
Meyer-Ahrens et al.

(10) Patent No.: US 7,285,316 B2
(45) Date of Patent: Oct. 23, 2007

(54) PROCESS TO MANUFACTURE THREE DIMENSIONALLY SHAPED SUBSTRATE FOR SOUND ABATEMENT

(75) Inventors: Sven Meyer-Ahrens, Leverkusen (DE); Thomas J. Matwiczyk, Bloomfield Hills, MI (US); Bin Lee, Coraopolis, PA (US); Michael A. Blaszkiewicz, Gibsonia, PA (US); Walter Guarnieri, Leverkusen (DE)

(73) Assignees: Bayer MaterialScience LLC, Pittsburgh, PA (US); Bayer Aktiengesellschaft, Leverkusen (DE)

( * ) Notice: Subject to any disclaimer, the term of this patent is extended or adjusted under 35 U.S.C. 154(b) by 285 days.

(21) Appl. No.: 10/845,990

(22) Filed: May 14, 2004

(65) Prior Publication Data

US 2004/0212125 A1 Oct. 28, 2004

Related U.S. Application Data

(62) Division of application No. 10/101,779, filed on Mar. 20, 2002, now Pat. No. 6,773,756.

(51) Int. Cl.
*B32B 3/12* (2006.01)
*B32B 3/06* (2006.01)
*B32B 27/00* (2006.01)

(52) U.S. Cl. .................. 428/160; 428/158; 428/297.4; 428/306.6; 428/308.4; 428/311.11; 428/423.1; 428/116

(58) Field of Classification Search ................ 521/172, 521/902; 428/116, 423.1, 137, 158–160, 428/297.4, 306.6, 308.4, 311.11
See application file for complete search history.

(56) References Cited

U.S. PATENT DOCUMENTS

| 3,001,973 A | 9/1961 | Piepenbrink et al. ......... 260/75 |
| 3,110,695 A | 11/1963 | Ceresa ...................... 260/45.5 |
| 3,124,605 A | 3/1964 | Wagner ...................... 260/453 |
| 3,152,162 A | 10/1964 | Fischer et al. ............... 260/453 |
| 3,201,372 A | 8/1965 | Wagner ...................... 260/77.5 |
| 3,277,138 A | 10/1966 | Holtschmidt et al. ....... 260/453 |
| 3,304,273 A | 2/1967 | Stamberger ................ 260/2.5 |
| 3,383,351 A | 5/1968 | Stamberger ................ 260/33.2 |
| 3,394,164 A | 7/1968 | McClellan et al. ......... 260/453 |
| 3,401,190 A | 9/1968 | Schmitt et al. ............. 260/453 |
| 3,454,606 A | 7/1969 | Brotherton et al. ....... 260/397.7 |
| 3,492,330 A | 1/1970 | Trecker et al. ............. 260/453 |
| 3,523,093 A | 8/1970 | Stamberger ................ 260/2.5 |
| 3,644,457 A | 2/1972 | Konig et al. ........... 260/453 SP |
| 3,769,318 A | 10/1973 | Windemuth et al. .... 260/471 C |
| 4,056,161 A | 11/1977 | Allen, Jr. .................... 181/290 |
| 4,374,885 A | 2/1983 | Ikeda et al. ................. 428/160 |
| 4,966,799 A | 10/1990 | Lucca et al. .................. 428/95 |
| 5,068,001 A | 11/1991 | Haussling ................... 156/222 |
| 5,266,143 A | 11/1993 | Albera et al. ............... 156/245 |
| 5,312,848 A * | 5/1994 | Klapper et al. ............. 521/172 |
| 5,486,256 A | 1/1996 | Romesberg et al. ........ 156/251 |
| 5,836,547 A * | 11/1998 | Koch et al. ............. 244/122 R |
| 5,888,610 A | 3/1999 | Fournier et al. ............ 428/116 |
| 6,109,389 A | 8/2000 | Hiers et al. ................. 181/290 |
| 6,267,838 B1 | 7/2001 | Saugnac et al. ............ 156/320 |

FOREIGN PATENT DOCUMENTS

| CA | 2189319 | 5/1997 |
| DE | 2004 408 | 8/1971 |
| DE | 29 15 474 | 11/1980 |
| DE | 197 02 581 | 8/1997 |
| EP | 0 137 125 | 4/1985 |
| EP | 0 251 267 | 1/1988 |
| EP | 0 304 005 | 2/1989 |
| EP | 1 022 297 | 1/2000 |
| GB | 848671 | 9/1960 |
| GB | 874430 | 8/1961 |
| GB | 911427 | 11/1962 |
| GB | 1040452 | 8/1966 |
| GB | 1 267 011 | 5/1972 |
| GB | 1 288 688 | 9/1972 |
| GB | 1 303 202 | 1/1973 |
| WO | 99/16602 | 4/1999 |

* cited by examiner

*Primary Examiner*—Cathy F. Lam
(74) *Attorney, Agent, or Firm*—Lyndanne M. Whalen; John E. Mrozinski, Jr.

(57) ABSTRACT

The present invention is directed to a process for the manufacture of three-dimensional acoustically sound automotive insulation parts. In particular, the process includes mixing a two component polyurethane resin, applying the resin to a substrate, molding the substrate and then trimming and demolding the resin applied substrate.

10 Claims, 4 Drawing Sheets

PROCESS TO MANUFACTURE THREE DIMENSIONALLY SHAPED SUBSTRATE FOR SOUND ABATEMENT

This application is a divisional of U.S. Ser. No. 10/101,779 filed on Mar. 20, 2002 now U.S. Pat. No. 6,773,756.

FIELD OF THE INVENTION

The present invention relates to a process for the manufacture of three-dimensional composites with structural and acoustical properties. The process of the present invention includes preparing a polyurethane resin and applying the resin to a first side of a substrate and subsequently molding the substrate to a desired three-dimensional shape. Further, the present invention relates to the manufacture of acoustically sound parts for automobiles, such as three dimensional dashboards, interior and engine side firewall insulation, engine side hood insulation, interior wheel well insulation and trunk compartment trim insulation.

BACKGROUND OF THE INVENTION

The interior of an automobile is normally insulated from sounds which are transmitted through the frame of the automobile, these sounds originate from tires, road noises, wind noises, engine noises, and noise from the other mechanical parts of the automobile. Numerous substrates are known in the art for abating sound from the exterior of an automobile to the interior of an automobile. For example, it is known in the art to provide for a fibrous material between the exterior noise and the interior of the automobile. The material dampens the sound transmissions and vibrations. There are a wide variety of damping materials known in the art, for example, non-woven textile fabrics, such as shoddy pads, and foamed polyurethane materials. It is also known in the art to apply an acoustical insulating barrier to the damping material via glue. Such an application normally occurs in the carpet of an automobile. See for example, U.S. Pat. Nos. 4,056,161; 4,966,799; 5,266,143; and 5,068,001. However, such acoustical damping materials are heavy.

Additionally, it is known in the art to produce a needled composite acoustical barrier, which limits the need for glues. See for example, U.S. Pat. No. 6,109,389. Additionally, it is known in the art to provide a panel or similar element with structural and acoustical properties formed of a cellular core coated on both sides with skins made of fabric plies of mineral or synthetic fibers impregnated with a thermoplastic resin, which is able to resist significant loads and perform acoustical attenuations. See for example, U.S. Pat. No. 5,888,610.

Also, there are two processes known in the art for preparing dashboard insulation that is mounted on the firewall of the automobile to shield and or absorb noise stemming from the engine. Generally, these dashboard barriers include a vacuum formed heavy layer bariumsulfate filled EVA or PVC or an injection molded TPO skin and a decoupler such as, a cast polyurethane foam, skived polyurethane foam, fiber mats made from polyester or natural fibers and shoddy pads. In the case of fiber mats, a phenolic binder is applied.

The process for the manufacture of known dashboard insulation involves heating a sheet of vinyl and then transferring the vinyl to a forming tool and subsequently vacuum forming the vinyl. If the barrier is a cast foam, liquid foam is then applied to the tooled vinyl in an open or closed tool operation and then the applied foam is demolded and trimmed. If the barrier is a fiber or a shoddy mat, the formed vinyl is transferred to another forming tool and the fiber or shoddy mat is added and formed and cured.

Barriers formed from this process generally have a double wall effect by decoupling the sound and vibration penetrating through the steel of the firewall from the heavy layer (second wall) by means of a soft flexible, absorptive material such as the foam or mat described above. Barriers containing a resinated phenolic shoddy pad primarily act as absorbers, absorbing sound penetrating through the firewall or sound which is reflected from the passenger compartment.

However, there remains a need in the art for a process to manufacture a three-dimensional molded composite that contains a substrate coated with a polyurethane resin on one side. Specifically, there remains a need in the art to provide lightweight acoustical and structurally sound three-dimensional insulation parts for automobiles.

SUMMARY OF THE INVENTION

It has been found that three-dimensional, acoustically sound automobile parts can be manufactured by applying a polyurethane resin to a first side of a substrate and subsequently molding the resin applied substrate.

Automobile parts made according to the present invention weigh less than conventional foam and heavy layer composites and provide better sound absorption than cast foam or flexible slabstock foam of the same thickness.

The present invention is also directed to a process for manufacturing three-dimensional acoustically sound dashmats.

Dashmats manufactured according to the present invention are self-supporting for ease of installation.

DETAILED DESCRIPTION OF THE INVENTION

Figure 1:
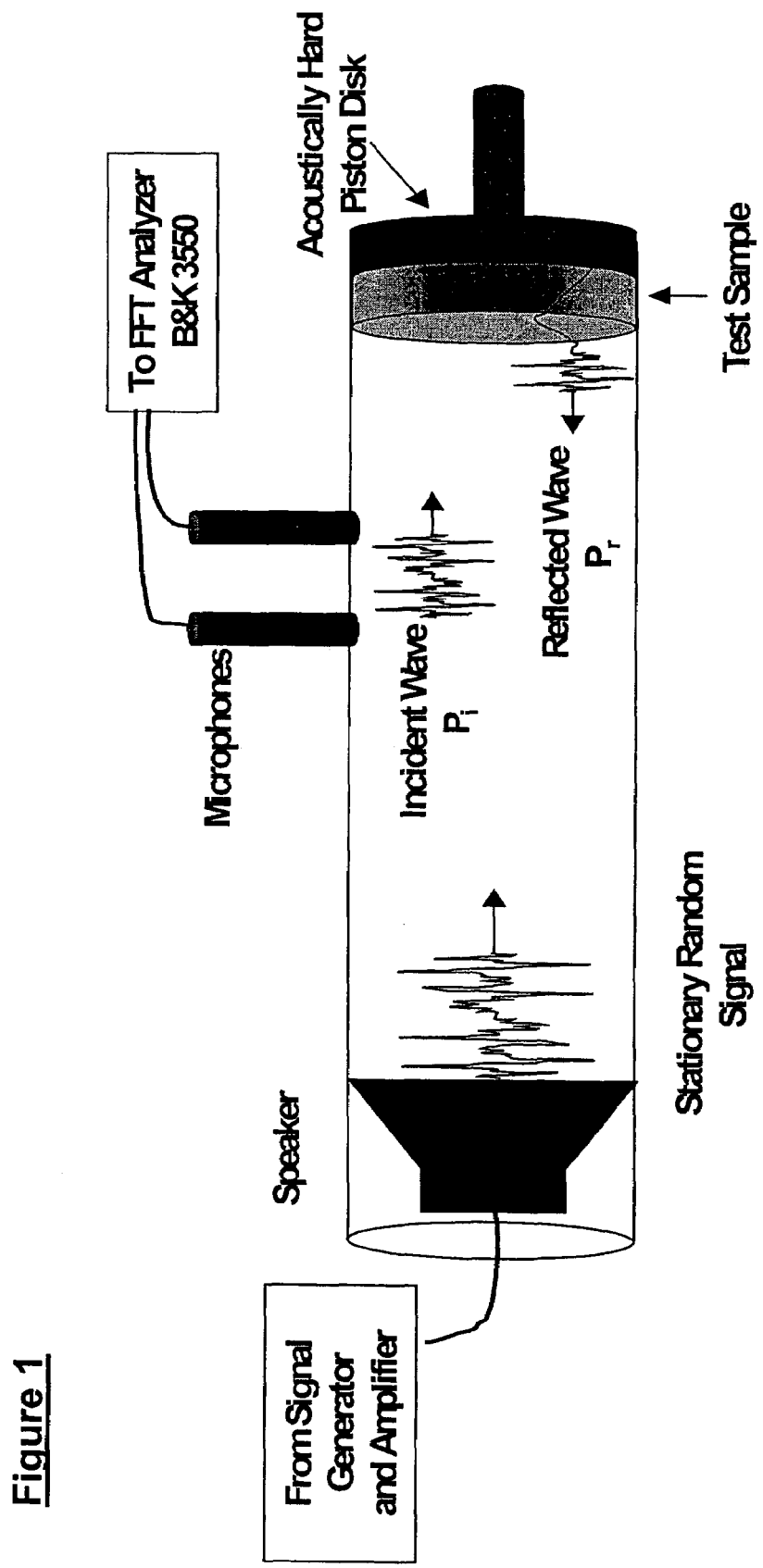
FIG. 1 schematically illustrates the impedance tube test equipment.

The present invention is directed to a process for the manufacture of three-dimensional composites for sound abatement. In particular, the present invention is directed to a method for producing a sound absorbing three-dimensional composite containing the steps of mixing a two component polyurethane resin comprising a polyol blend and an isocyanate, then applying the resin to a first side of a substrate, and subsequently transferring the resin coated substrate to a hot forming tool, molding the resin coated substrate into a composite, and finally removing the composite from the tool after curing and trimming the composite. Further, according to the present invention, the three dimensional composite may optionally have the resin applied to both sides of the substrate.

The polyurethane resin used in the present invention can be processed at a wide range of polyol/isocyanate ratios. Preferably, the polyurethane resin used in accordance with the present invention has a NCO index in the range of 90 to 130, more preferably in the range of 100 to 120.

The polyurethane resin used in the present invention contains a polyol blend. Generally, the polyol blend of the present invention contains at least one polyol or isocyanate reactive component. The first polyol is generally present in the range of about 30 to about 80 weight percent of the total blend, preferably 45 to about 65 weight percent. The second polyol is generally present in the range of about 10 to about 64 weight percent, preferably in the range of about 27 to about 47 weight percent. Optionally, the polyol blend further comprises about 0 to about 20 weight percent of a fatty acid, preferably from about 3 to about 10 weight percent of a fatty acid. The polyol blend may also comprise a catalyst in the range of about 0 to about 5 weight percent, preferably about 0.2 to about 1 weight percent. Also, the polyol blend may further comprise a filler present in an amount of about 0 to about 20 weight percent, preferably about 1 to about 5 weight percent. Additionally, black pigments can be added to the polyol blend if required in an amount of 0 to 5 weight percent, preferably about 0.5 to 2 percent. Carbon black has been used widely in the industry as a pigment, however, organic dyes can also be used. Optional wetting agents at an amount of 0 to 5 weight percent can also be used, preferably 0.1 to 2 weight percent based on the total weight of the polyol blend, to further enhance the wet-out of urethane to various mats.

Generally, isocyanate reactive compounds include, for example, hydroxyl group containing compounds. These materials may be typically divided into two groups, high molecular weight compounds having a molecular weight of 500 to 10,000 and low molecular weight compounds having a molecular weight of 62 to 499. The preferred polyols of the present invention are low molecular weight polyethers derived from commonly used starters such as 4,4'-dihydroxy diphenyl propane, sucrose, aniline, ammonia, toluene diamine, monoethanolamine, propylene glycol, ethylene glycol, trimethylol propane, and ethylene diamine.

Polyethers modified by vinyl polymers, of the type formed, for example, by polymerizing styrene or acrylonitrile in the presence of polyether (U.S. Pat. Nos. 3,383,351; 3,304,273; 3,523,093; and 3,110,695; and German Patent 1,152,536) are also suitable, as are polybutadienes containing OH groups. Additionally, suitable hydroxyl group-containing polyols include ethylene glycol, 1,2- and 1,3-propylene diol, 1,3- and 1,4 and 2,3-butane diol, 1,6-hexane diol, 1,10-decane diol, diethylene glycol, triethylene glycol, tetraethylene glycol, dipropylene glycol, tripropylene glycol, glycerol and trimethylol propane.

Useful polyols for the present invention include polyester polyols derived from the condensation of e.g. adipic acid, phtalic acid or other aliphatic or aromatic dicarboxilic acids or their anhydrides with low molecular weight diols, such as, propyleneglycol, di-propyleneglycol, tri-propyleneglycol, or tetrapropyleneglycol or ethyleneglycol and its oligomers, butanediol, hexanediol or other aliphatic diols, bis-Phenol-A or other aromatic diols used in the art of making polyester polyols. Also, polycaprolactam or polylactides may be in the polyol compositions of the present invention. Naturally occurring polyester polyols like castor or modified soybean oil, raps oils or linseed oil or condensation products of ricinolic acid and butanediol or polyricinolic acid may also be used for the formulation of the polyol blend used in accordance with the present invention.

The polyol blend used in the present invention may also include a fatty acid. Suitable fatty acids include, for example, fatty acids such as those acids presented by the formula: $R(CO_2H)_n$, wherein n is 1, 2, or 3 and where R contains at least 10 carbon atoms. R may be alkyl (i.e. cyclic, linear, or branched), alkaryl, aralkyl, or aryl, saturated or unsaturated. Examples of useful acids include, for example, n-decanoic acid, neodecanoic acid, lauric acid, palmitic acid, stearic acid, isostearic acid, oleic acid, linoleic acid, and the like. Oleic acid is the preferred fatty acid.

Other additives which may be used in the present invention include catalysts such as, for example, various organic metal compounds, including, for example, tin(II) salts of carboxylic acids, dialkyl tin salts of carboxylic acids, dialkyl tin mercaptides, dialkyl tin dithioesters and tertiary amines, such as, for example, dimethyl-cyclohexylamine (i.e. Polycat 8), pentamethyidiethylenetriamine (i.e. Polycat 5), potassium acetate (i.e. Polycat 45), bis[2-(dimethylamino)ethyl] ether (Niax A-1), dimethyl-ethanolamine (DMEA), Dabco WT, etc. Of course, it is also possible to use any of the catalysts, which are well known to those skilled in the art of polyurethane chemistry.

Suitable fillers and reinforcing agents that may be included in the polyol blend as described hereinabove include both organic and inorganic compounds, for example, compounds such as glass in the form of fibers, flakes, cut fibers, or microspheres; mica, wollastonite; carbon fibers; carbon black; carbon black paste; talc; and calcium carbonate. Also reground polyurethane with a particle size below 100 microns from e.g. production trim of seat cushions and SRIM or RIM parts may be used as fillers.

Starting polyisocyanate components for use in the present invention include aliphatic, cycloaliphatic, araliphatic, aromatic and heterocyclic polyisocyanates of the type described, for example, by W. Siefken in Justus Liebigs Annalen der Chemie, 562, pages 72 to 136. Specific examples of these compounds are ethylene diisocyanate, 1,4-tetramethylene diisocyanate, 1,6-hexamethylene diisocyanate; 1,12-dodecane diisocyanate, cyclobutane-1,3-diisocyanate; cyclohexane-1,3- and -1,4-diisocyanate and mixtures of these isomers. Additional examples are 1-isocyanato-3,3,5-trimethyl-5-isocyanato-methyl cyclohexane (German Auslegeschrift No. 1,202,785, U.S. Pat. No. 3,401,190), 2,4- and 2,6-hexahydro-tolylene diisocyanate and mixtures of these isomers. Hexahydro-1,3- and/or -1,4-phenylene diisocyanate; perhydro-2,4'- and or -4,4'-diphenylmethane diisocyanate; 1,3- and 1,4-phenylene diisocyanate; 1,4- and 2,5-tolylene diisocyanate and mixtures of these isomers are also suitable in the present invention. Diphenyl- methane-2,4- and/or-4,4'-diisocyanate; naphthylene-1, 5-diusocyanate; triphenyl methane-4,4'-4"-triisocyanate; polyphenyl polymethylene polyisocyanates of the type obtained by condensing aniline with formaldehyde, followed by phosgenation and described, for example, in British Patent Nos. 874,430 and 848,671 may also be used in the present invention; m- and p-isocyanato-phenylsulfonyl isocyanates according to U.S. Pat. No. 3,454,606; perchlorinated aryl polyisocyanates of the type described, for example, in German Auslegeschrift No. 1,157,601 (U.S. Pat. No. 3,277,138); polyisocyanates containing carbodiimide groups of the type described in German Patent No. 1,902, 007 (U.S. Pat. No. 3,152,162); diisocyanates of the type described in U.S. Pat. No. 3,492,330; and polyisocyanates containing allophanate groups of the type described, for example, in British Patent No. 993,890, in Belgian Patent No. 761,626 and in published Dutch Patent Application No. 7,102,524 are still further examples of suitable isocyanates.

Additionally, polyisocyanates containing isocyanurate groups of the type described, for example, in U.S. Pat. No. 3,001,973; in German Offenlegungsschriften Nos. 1,929,034 and 2,004,408; polyisocyanates containing urethane groups of the type described, for example, in Belgian Patent No. 752,261 or in U.S. Pat. No. 3,394,164; polyisocyanates containing acylated urea groups according to German Patent No.1,230,778 and polyisocyanates containing biuret groups of the type described, for example, in German Patent No. 1,101,394 (U.S. Pat. Nos. 3,124,605 and 3,201,372) and in British Patent No. 889,050 are also suitable.

Aromatic polyisocyanates, which are liquid at the processing temperature, are preferably used. The preferred starting polyisocyanates include derivatives of 4,4'-diisocyanato-diphenyl- methane which are liquid at room temperature, for example, liquid polyisocyanates containing urethane groups of the type obtainable in accordance with German Patent No.1,618,380 (U.S. Pat. No. 3,644,457). These may be produced for example, by reacting 1 mole of 4,4'-diisocyanato-diphenylmethane with from 0.05 to 0.3 mols of low molecular weight diols or triols, preferably polypropylene glycols having a molecular weight below 700.

Preferably, the aromatic polyisocyanates used with the present invention have a 2,4-diphenylinemethane diisocyanate content in the range of about 1 to about 16 weight percent, more preferably in the range of about 2 to about 12.

Optionally, in accordance with the present invention, preploymers can be used as a component to the polyurethane resin. In accordance with the present invention, the polyol component can be reacted in the absence of catalysts with the polyisocyanate to prepare a prepolymer. To prepare the polyurethane resin, the remaining portion of the polyol can be added and the components allowed to react together in the presence of catalysts and other appropriate additives. Other additives may be added to either the prepolymer or remaining polyol or both prior to the mixing of the components, whereby at the end of the reaction, the polyurethane resin is provided.

Substrates suitable for use in the present invention include fiber mats comprised of flax, flax-sisal, hemp, jute, polyurethane foam granules or mixtures thereof, mats of natural fiber and synthetic fiber comprised of hemp plus polypropylene or polyether fibers, synthetic mats made of polyether fibers, shoddy pads, flexible or rigid-formable polyurethane foam. Preferably, the substrate weighs between 400 and 1200 g/m$^2$. The fiber mats may comprise about 0.01 to about 50 wt. % of polypropylene or polyester. If the fiber mat is flexible polyurethane foam it may have a density from about 12 to about 75 kg/m$^3$, and if the fiber mat is rigid formable foam, it may have a density from about 10 to about 40 kg/m$^3$.

The above-described two component polyurethane resin can be applied to the substrate by any known means in the art; preferably by brushing, raking or via a roller coater. More preferably, the two component polyurethane resin is sprayed on a first side of the substrate by means of a high-pressure spray head (pressure>500 psi) using impingement mixing or by using a low-pressure unit with a static mixer in the spray head (pressure <150 psi).

Generally, the polyurethane resin can be applied to the substrate in an amount of 150 to about 1500 g/m$^2$. The compositions according to the present invention may be molded using conventional processing techniques. Generally, the substrate is molded in conventional presses at a mold or tool temperature between 90 to 130° C. for about 60 to about 120 seconds. Optionally, a paper honeycomb sheet may be placed under the resin coated substrate prior to molding the composite to provide improved strength.

Acoustically sound automotive parts manufactured according to the present invention include three-dimensional dashmats, interior and engine side firewall insulation, engine side hood insulation, interior wheel well insulation and trunk compartment trim insulation.

The invention is further illustrated but is not intended to be limited by the following examples in which all pads and percentages are by weight unless otherwise specified.

EXAMPLES

General Procedure

The following isocyanates and polyols are examples of components of the polyurethane resin useful in the present invention:

Isocyanate 1: A commercially available aromatic polymeric diphenylmethane diisocyanate having a 2,4 MDI isomer content in the range of 1 to 7 weight percent.

Isocyanate 2: A reacted mixture (or prepolymer) of about 80 to about 100 weight percent of isocyanate 1 and about 0.01 to about 20 weight percent of a commercially available oleic acid/adipic acid/pentaerythritol mixture.

Isocyanate 3: A commercially available aromatic polymeric 2,4, diphenylmethane diisocyanate.

Polyol A: A polyether made from a sucrose/polyglycol/water starter having a molecular weight of about 440.

Polyol B: A polyether made from a monoethanolamine starter having a molecular weight of about 240.

TABLE 1

| Polyol Blend | |
|---|---|
| Component | Wt. % |
| Polyol A | 55 |
| Polyol B | 37 |
| Oleic Acid | 5 |
| Potassium acetate (Polycat 45, Air Products) | 0.5 |
| Black paste | 2.5 |

Example 1

A sheet of a Flax-Sisal mat (50% flax, 50% sisal) with an area weight of ca. 1000 g/m$^2$ was placed on a horizontal support fixture. The size of the mat was based on the dimensions of the forming tool. The mat should cover all parts of the tool during the forming step. The polyol formulation according to Table 1 in conjunction with Isocyanate 2, having a mixing ratio of PFOLYOL/ISO of 100:139.4 was applied to the top surface of the mat by means of a low pressure-mixing head with an internal static mixer. Useful equipment for this type of application is available, for example, from Langemann. The typical pressure was 300 psi, the throughput was adjusted to ca. 20 g/s and the total amount of polyurethane resin sprayed on the mat was ca. 500 g/m$^2$.

The substrate was then transferred into an aluminum forming tool which was heated to 90° C. The substrate was placed on the male part of the mold in such a way that the resinated surface pointed towards the male part of the mold. Consequently, the polyurethane layer of the finished part was pointed towards the sound source. Because the mold used for manufacture of the described part was designed for molding conventional dash insulators comprising a vinyl heavy layer and a molded polyurethane flexible foam, a supportive layer of shoddy pad (uncompressed thickness of ca. 5 cm, density ca. 70 kg/m$^3$) was placed on top of the substrate to provide the necessary compression force during the forming operation. The mold was closed and the resin was allowed to cure for 120 seconds. Afterwards the part was removed from the mold, cleaned from the supportive shoddy pad and trimmed.

Impedance Tube Test

The substrate prepared in Example 1 and conventional insulators were impedance tube tested. ASTM E 1050 (Standard Test Method for Impedance and Absorption of Acoustical Materials Using a Tube, Two Microphones, and a Digital Frequency Analysis System) was the procedure used to produce the data in FIGS. 2-4.

The two microphone, impedance tube method test set-up is shown schematically in FIG. 1. A Bruel & Kjaer system containing an impedance tube, two ¼" condenser microphones, a power amplifier, a fast Fourier transform multi-channel analyzer, and a computer with Bruel & Kjaer software was used. Two different sized tubes were used for measurements in different frequency ranges. The large tube (100 mm diameter) is used for frequencies from 100 Hz to 1600 Hz, and the small tube (29 mm diameter) for frequencies from 500 Hz to 6400 Hz.

The speaker located at one end of the tube generates a broadband stationary acoustic plane wave in the tube. The test sample is located at the opposite end with a rigid piston backing. The broadband wave is separated into incident and reflected components by using a transfer function relation between the acoustic pressures at the two locations on the tube wall. The analyzer calculates the magnitude of the reflection coefficient, R, from the amplitude ratio of the reflected to incident pressure at each frequency of interest. Then, the frequency dependent SA coefficient is given by:

$$\alpha(f)=1-R(f)^2$$

The ASTM method recommends testing at least two 29 mm and two 100 mm specimens cut from the same block of material. Averaging these results will give a better estimate of the material performance, since some of the inherent variability of the parts will be taken into account.

Figure 2:
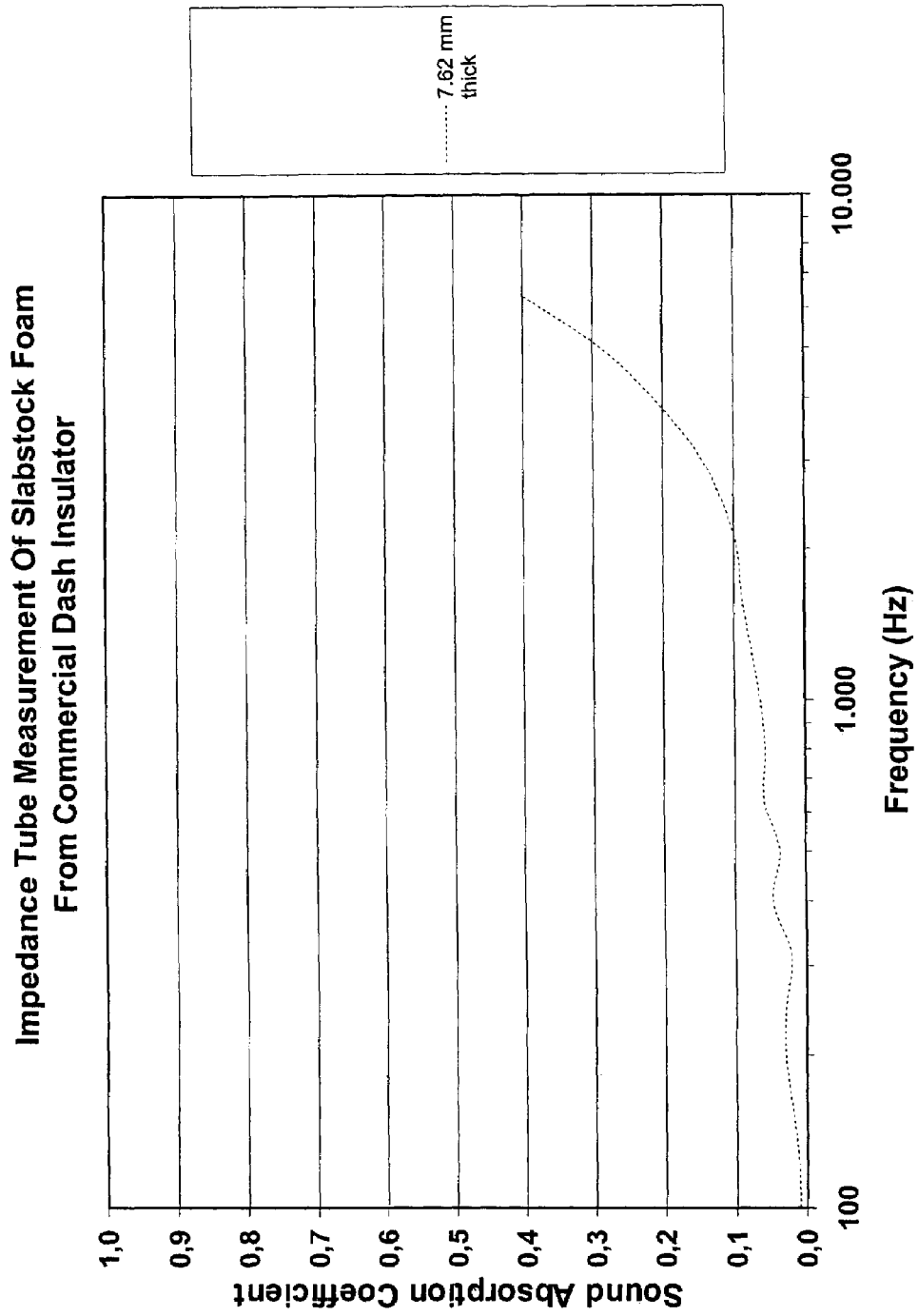
FIG. 2 illustrates the sound absorption coefficient of slabstock foam having a thickness of 7.62 mm, from a commercial dash insulator at a frequency range of 100 to 6,400 Hz.
Figure 3:
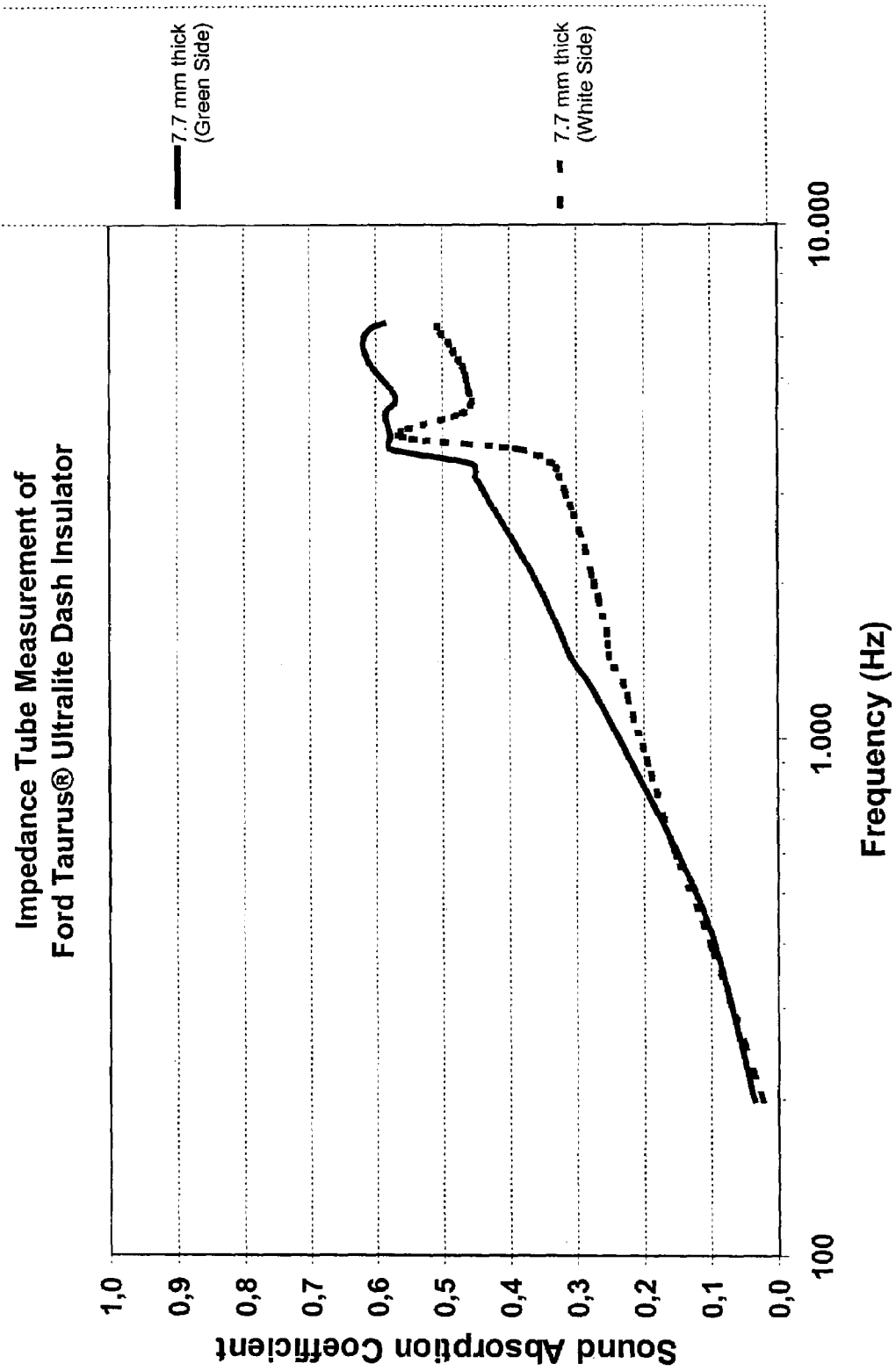
FIG. 3 illustrates the sound absorption coefficient of the Ford Taurus® Ultralite Dash Insulator at a frequency range of 100 to 6,400 Hz.
Figure 4:
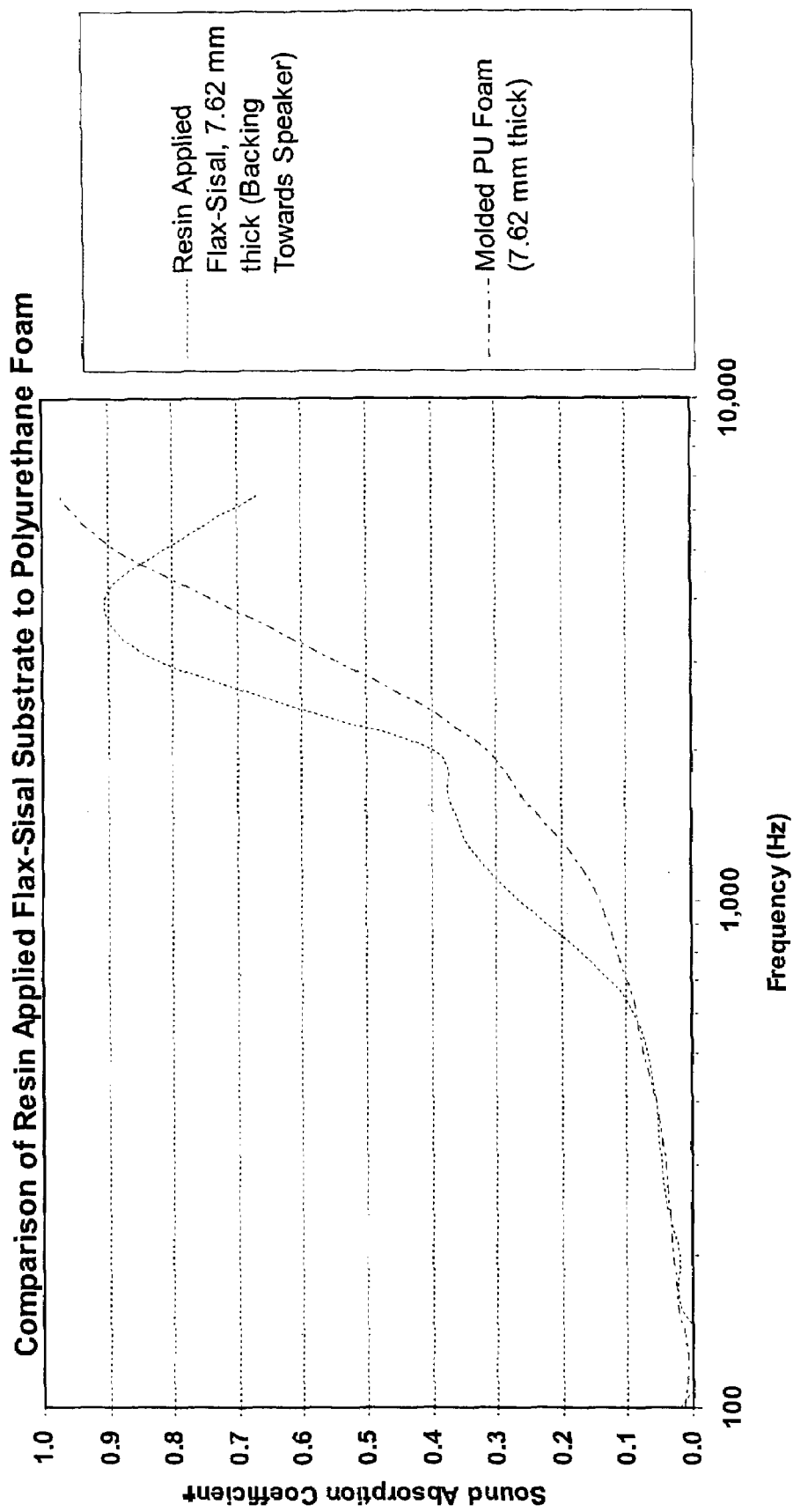
FIG. 4 comparatively illustrates the sound absorption coefficient of a polyurethane-coated flax sisal fiber mat, according to the present invention, to conventional polyurethane foams at a frequency range of 100 to 6,400 Hz.

As comparatively illustrated in FIGS. 2, 3 and 4 the polyurethane resin components prepared in accordance with the present invention are less dense and have higher sound absorption than other sound insulators known in the art.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A three-dimensional composite comprising a substrate and a polyurethane resin, wherein the polyurethane resin having a NCO index in the range of 90 to 130, is applied onto a first side of the substrate; wherein the substrate is chosen from natural fiber mats, synthetic fiber mats, shoddy pads, flexible polyurethane foam, rigid formable polyurethane foam and mixtures thereof;
   a same polyurethane resin and/or a honeycomb paper sheet is applied to a second side of the substrate;
   the resin applied substrate is molded and wherein the three-dimensional composite has a sound absorption coefficient at 1000 Hz of about 0.25 and at 3000 Hz of about 0.8.

2. The three-dimensional composite according to claim 1, wherein the polyurethane resin has a NCO index in the range of 100 to 120.

3. The three-dimensional composite according to claim 1, wherein the fiber mats comprise from about 0.01 to about 50% of polypropylene or polyester, wherein the fiber mat has an area weight of from about 400 to about 1200 g/m$^2$.

4. The three-dimensional composite according to claim 1, wherein the flexible polyurethane foam has a density from about 12 to about 75 kg/m$^3$.

5. The three-dimensional composite according to claim 1, wherein the rigid formable polyurethane foam has a density from about 10 to about 40 kg/m$^3$.

6. The three-dimensional composite according to claim 1, wherein the substrate weighs from about 400 to about 1200 g/m$^2$.

7. The three-dimensional composite according to claim 1, wherein the polyurethane resin comprises about 30 to about 60 wt. % of a polyol blend and about 25 to about 55 wt. % of an isocyanate.

8. The three-dimensional composite according to claim 7, wherein the polyol blend comprises a first polyol in the range of about 30 to about 80 wt. % and a second polyol in the range of about 10 to about 64 wt. %, wherein the weight percent is based upon the total weight of the polyol blend.

9. The three-dimensional composite according to claim 7, wherein the polyol blend further comprises a fatty acid, a catalyst and a filler.

10. The three-dimensional composite according to claim 9, wherein the fatty acid is present in the range of about 1 to about 20 wt. %, wherein the catalyst is present in the range of about 1 to about 2 wt. % and wherein the filler is present in the range of about 1 to about 10 wt. %, wherein the weight percent is based upon the total weight of the polyol blend.

* * * * *